United States Patent [19]

Mottur et al.

[11] Patent Number: 4,803,091
[45] Date of Patent: Feb. 7, 1989

[54] CORN SPIRALS AND METHOD OF MANUFACTURE

[75] Inventors: George P. Mottur, Danville; Norman E. Peters, Berwick; Ron L. Nietz, Bloomsberg, all of Pa.

[73] Assignee: Borden, Inc., Columbus, Ohio

[21] Appl. No.: 170,114

[22] Filed: Mar. 17, 1988

Related U.S. Application Data

[63] Continuation of Ser. No. 824,720, Jan. 31, 1986, abandoned.

[51] Int. Cl.$^4$ .............................................. A23L 1/10
[52] U.S. Cl. ..................... 426/439; 426/549; 426/448; 426/449; 426/626; 426/496; 426/517; 241/29
[58] Field of Search ............... 426/439, 549, 448, 449, 426/626, 496, 517; 241/291

[56] References Cited

U.S. PATENT DOCUMENTS

| | | | |
|---|---|---|---|
| D. 10,882 | 10/1878 | Mills | D1/125 |
| D. 11,173 | 4/1879 | Mills | D1/125 |
| D. 67,351 | 5/1925 | Ranucci | D1/126 |
| D. 91,058 | 11/1933 | De Palo | D1/122 |
| D. 93,253 | 9/1934 | Tanzi | D1/122 |
| D. 100,510 | 7/1936 | Tanzi | D8/1 |
| D. 105,620 | 8/1937 | Tanzi | D8/1 |
| D. 116,617 | 9/1939 | Tanzi | D8/1 |
| D. 166,695 | 5/1952 | Maldari | D8/1 |
| D. 167,956 | 10/1952 | Ronzoni | D8/1 |
| D. 186,937 | 12/1959 | Tanzi | D8/1 |
| D. 214,659 | 7/1969 | Cooper et al. | D1/1 |
| D. 215,261 | 9/1969 | Cooper et al. | D1/1 |
| D. 224,077 | 7/1972 | Duvall et al. | D1/1 |
| D. 228,827 | 10/1973 | Cammelot et al. | D1/2 |
| 1,566,705 | 12/1925 | Tanzi | 426/501 |
| 1,946,238 | 2/1934 | Ronzoni | 426/501 |
| 2,431,074 | 11/1947 | Palmer | 426/549 |
| 2,584,893 | 2/1952 | Lloyd et al. | 426/622 |
| 2,621,615 | 12/1952 | Lombardi | 426/557 |
| 2,905,559 | 9/1959 | Anderson et al. | 426/439 |
| 3,020,162 | 2/1962 | Cunningham et al. | 426/439 |
| 3,046,139 | 7/1962 | Gould et al. | 426/622 |
| 3,212,904 | 10/1965 | Gould et al. | 426/622 |
| 3,278,311 | 10/1966 | Brown et al. | 426/439 |
| 4,126,706 | 11/1978 | Hilton | 426/438 |
| 4,288,463 | 9/1981 | Groff et al. | 426/500 |
| 4,504,511 | 3/1985 | Binley | 426/565 |
| 4,513,018 | 4/1985 | Rubio | 426/622 |
| 4,530,849 | 7/1985 | Stanley et al. | 426/439 |

OTHER PUBLICATIONS

Illustration from a recipe in *House and Garden*, Jun. 1975, p. 101.
Advertisement for Nabisco's Korkers in *McCall's*, Jun. 1972.
Article on pasta by Doris Eby in *Better Homes and Gardens*, Sep. 1970.
Article entitled "New Corn Chip Goes Continuous", in *Canner/Packer*, Jul. 1961, p. 25.

*Primary Examiner*—Jeanette Hunter
*Attorney, Agent, or Firm*—Robbins & Laramie

[57] ABSTRACT

Fried snack food product in ribbon-like form, preferably spiral, of a masa dough that has been ground and then further comminuted by cutting to have a maximum particle size of 0.05 inch.

11 Claims, No Drawings

CORN SPIRALS AND METHOD OF MANUFACTURE

This application is a continuation of application Ser. No. 824,720, filed Jan. 31, 1986, now abandoned.

BACKGROUND OF THE INVENTION

Small snack food products have been manufactured in a wide variety of shapes and sizes, including scoops, cups, containers, cones, triangles, roll, squares and curls. Corn chips and potato chips are generally planar, concave or ridged. Pretzels are long, short, thick or thin, and twisted into a variety of shapes.

Snack food products have been made from masa in the past, but the masa has been made in a conventional manner by grinding. Grinding is traditional, but produces masa having coarse particle sizes because all attempts to produce very fine particle sizes by grinding generate enough frictional heat so that the masa will become overly cooked. This has led the public to expect certain mouth-feel and texture characteristics in snack products produced from masa.

Corn has also been processed for use in making snacks on comminution devices, such as Fitz mills or hammermills, with a cutting action that reduce particle size by a cutting action rather than by a grinding action. Generally, the product of such a process is a masa of reduced cohesion between its particles that results in a characteristic mouth-feel and texture in products made from this kind of material.

Prior art processes for manufacturing corn flour or corn chip snack products are also varied. These processes all have at least one grinding step.

Often the manufacturer of a snack food product will begin the manufacturing process with a prepared flour or meal, which is used to form a dough, masa, or the like. In this case, the manufacturer has no concern, generally, with the initial material, but contributes to the product just the formulation and manufacturing steps that utilize the flour or meal as a raw material. Where the manufacturer does produce the flour or meal, it is generally produced by a grinding, cutting, or attrition step. Since each of these processes requires a different piece of equipment, generally only one type of operation is performed.

SUMMARY OF THE INVENTION

In its broad aspects, the invention in one embodiment is a cooked snack food product comprising a ribbon-like piece of fried dough made from a masa that has been ground and then further processed to reduce particle size by comminution involving a simultaneous grating and cutting action.

According to a preferred embodiment of the invention, this ground, grated and cut masa is extruded through dies that form a ribbon-like sheet. In a preferred embodiment, this sheet is extruded through dies that also twist it to have a spiral shape. The extruded spiral material is cut into suitable lengths, which are then fried in hot oil to a final moisture content in the range 0.5% to 1.5% by weight. The spiral shaped product is marketable and appealing to consumers because of the thinness of the masa ribbon from which it is manufactured. The thinness of the ribbon is dependent upon the reduction of the number of large particles in the masa. A fine masa provides a more desirable texture in the helical shaped product due to the second milling step of the process. The second milling step is a comminution of the masa particles by simultaneous grating and cutting actions. Although the masa produced by this process may be used to produce a snack food product of any shape, the spiral shape emphasizes the desirable texture for the consumer.

A maximum particle size of 0.06 inch is insured by forcing the masa through a plate having perforations of the desired maximum size, prior to extruding it.

The preferred snack food structure is a spiral having an axial length of about 2¼ inches. The spiral shape gives the product a unique and pleasant mouth-feel in addition to making the spirals particularly adaptable for use with dips. The gaps between flights trap and hold more dip than a comparably-sized flat ribbon chip, and the twisting of the ribbon into spiral form imparts mechanical strength against breaking when the spiral passes through dip. The texture of the corn spiral is softer and more delicate than standard corn chips, due primarily to its process of manufacture.

The process of the invention involves subjecting a ground masa to comminution by simultaneous grating and cutting that reduces the size of the particles in the masa. The comminuted masa is then screened to insure that the maximum particle size cannot exceed 0.06 inch. The screened masa is then extruded through a die to a ribbon-like form. The ribbon-like extrudate is then cut to snack-sized pieces of the desired length, which in turn are cooked in hot oil to achieve a final product moisture content in the range 0.5% to 1.5% by weight.

When beginning the process with whole corn kernels, the process of manufacturing involves adding water and lime to whole kernels of corn and cooking the mixture at the boiling point. Cold water is added to the mixture and the mixture is allowed to stand for approximately eight hours. The kernels are then washed with additional water to remove the hulls, after which the kernels are ground between rotating surfaces to form masa.

Masa is a sticky, pliable paste that consists of an agglomeration of moist, soft particles of different sizes. The masa is then comminuted in an Urschel Comitrol mill or like device that has a simultaneous grating and cutting action. This creates a very fine masa with particles which will not block the narrow openings of the extruder dies necessary to produce the helical shape. The finely ground masa is then passed through extruder and helix-forming dies. The resulting corn spirals are extruded downward into a continuous fryer. After frying, the corn spirals may be seasoned or flavored, then cooled and packaged.

DETAILED DESCRIPTION OF THE INVENTION

In one preferred embodiment, the snack food product of the invention is a fried and seasoned corn dough product formed in a spiral shape. The color of the product is a golden yellow, and the flavor of the salted product is that of toasted corn. Other seasonings or flavors that may be applied to the corn spiral to give it more distinctive tastes are nacho flavoring, barbeque flavoring, or butter flavoring.

The soft and delicate texture of these corn spirals, as well as their crunch, is primarily due to the process of manufacture, and also to the oil and moisture content of the product. The oil content of these corn spirals is within the range of 28.0% to 36.0%, with an optimum percentage of 34.0%, while the residual moisture content is within the range of 0.5% to 1.5%, with an optimum value of 1.0%.

The process of manufacturing a preferred snack food product with these characteristics begins by delivering whole-kernel corn from its storage silo to a steam-jacketed cooking kettle by means of a screw conveyor. Approximately 450 pounds of corn form a batch of convenient size. The preferred type of corn is a pale yellow Hybrid Variety or a 1:1 blend of white and yellow varieties.

After the corn has been delivered to the kettle, 80 gallons of water are metered into the kettle and the temperature of the corn and water mixture is brought to about 150° F. At this point, 3 pounds, 11 ounces of lime (calcium hydroxide USP or its equivalent) are added to the corn and water mixture, and the entire mixture is cooked for 15-35 minutes after reaching the boiling point at atmospheric pressure. The steam pressure applied to the kettle jacket during the cooking stage is about 60 psig. The cooking time may be varied within the limits given, as required, in order to obtain the desired oil absorption in the finished product.

When the cooking stage is completed, the cooked corn is discharged into a transfer tank. An additional 70 gallons of cold water are added to the mixture by rinsing the cooking kettle into the transfer tank. Then the entire corn/water mixture is pumped into rectangular, stainless steel, open-top soaking tanks of approximately 240 gallons capacity. The corn is levelled in the soaking tanks so as to be completely covered with water, and then allowed to soak quiescently for preferably 8 hours and 15 minutes (although the corn may soak longer, for a maximum time of 12 hours and 15 minutes).

When the soaking is completed, each batch is pumped into a rotary washer where the corn is washed by spraying with fresh water. The washing removes corn hulls and other debris, as well as any residual lime. The hulls are considerably softened from the previous heat and lime treatment stage. The washings are discarded to waste or are taken for by-product recovery.

The washed and drained dehulled corn is then transferred to mechanical grinders, where it is ground into masa. The mechanical grinders operate to grind the corn between rotating grinding surfaces. The coarseness of the ground masa is controlled by visual examination, and by adjustment of the grinding surfaces. A conveyor belt transports the ground masa to an Urshel Comitrol mill fitted with a #30 grinding head. A Teflon-lined funnel is located on the top of the Comitrol mill, the point at which the masa enters. The Teflon surface of the funnel keeps the masa from sticking to the inside surface of the funnel. In addition, the entire inside surface of the Comitrol mill, except for the lid, the impeller, and the grinding head, is also lined with Teflon.

An oil spray system is mounted above the entrance funnel and sprays cottonseed oil onto the masa as it enters the Comitrol mill to be comminuted. The spray rate is about one gallon of oil per hour of grinding time. The oil acts as a lubricant to keep the masa from sticking to the inside of the mill, and also contributes to the texture characteristics of the finished product.

Also necessary to insure the delicate texture characteristics of the corn spirals product is the comminuting step performed by the Comitrol mill. The mill reduces the size of particles by simultaneous grating and cutting, rather than grinding. A mechanical grinder alone could not grind particles as fine as those comminuted by the Comitrol mill without creating much frictional heat and consequently turning out an extremely overcooked masa. Comminution through the Comitrol mill only, without pregrinding, produces a masa of reduced cohesion between its particles, which gives a very different and less desirable texture to the final fried product.

The Comitrol mill has a rotary impeller that is disposed within a perforated cylindrical "cutting head". Material that is fed into the bore of the cutting head is forced by the impeller against the inner surface of the cutting head and the material is forced by the impeller through the rectangular perforations in the cutting head. The portions of the cutting head about the perforations are sharpened, so that a grating, as well as a cutting action, is applied to masa that is forced through the perforations by the impeller. Perforation sizes are generally uniform in a given cutting head, but different cutting heads have perforations of different dimensions. The dimensions of the rectangular perforations in the preferred #30 cutting head are 0.030 inch by 0.160 inch.

In addition to enhancing the texture of corn spirals, the comminuting step further reduces the size of particles in the masa which otherwise would have been too large to pass through the openings of the extruder dies after only the one grinding step. After having its particle size reduced by the simultaneous grating and cutting action of the Comitrol mill, the masa is discharged from the bottom of the Comitrol mill onto a conveyor belt that transfers the masa to another conveyor belt, which delivers the masa to a supply hopper located on top of a Marline continuous-type extruder or the equivalent. The moisture content of the masa at this point is about 45% to 54%.

The Marlin extruder is a piston-type extruder that is fitted with a special flared barrel or "bell". The flared barrel is modified to contain a changeable screen which prevents any large particles from getting into the dies and blocking them. The preferred screen is made of 22-gauge stainless steel, and is perforated with holes that are 3/64ths inch (about 0.05 inch) in diameter. The holes are staggered, and there are about 131 holes per square inch. Screens with holes of different sizes may be used. Generally, the size of the holes of the screen is the same as the size of the opening of the die being used, so as to prevent particles that are too large to pass through the die opening from reaching said opening. If the screen becomes blocked, it should be removed and replaced with another screen by means of a fast-acting screen-changing mechanism. The screen acts as a "fail-safe" to remove any remaining large particles of masa which might otherwise have survived the Comitrol mill treatment and which would severely block the extruder dies. Even a slight or partial blockage of a die would create severe shape distortion of the resulting corn spiral, resulting in a less desirable product for the consumer. The comminuting step produces masa with particles which will not cause rapid blockage of the screen or the extruder dies. Masa subjected to only the grinding step completely blocks the screen in a short time and thereby blocks flow of the masa to the extruder dies. A masa that is the product of a single grinding step leaves 0.2134%, on a dry weight basis, on the preferred screen of the inventive process, in contrast to 0.0127%, on a dry weight basis, that remains on the screen after a masa that has been both ground and comminuted by a Comitrol mill is passed through the screen. The difference in the amount of masa left on the screen accounts for the rapid blockage of the screen that occurs with a ground masa, and the reduced blockage that occurs with a masa that has been both ground and comminuted by a Comitrol mill.

The masa is forced by pressure through an elbow-shaped extruder head, and thence through a spiral-forming die into 26 discrete, twisted ribbons which form spirals that are between 0.20 inch and 1.0 inch, and preferably 0.515 inch, in diameter. The thickness of the ribbon is preferably in the range of about 0.055 inch to 0.065 inch. Thicknesses as great as about 0.100 inch can be useful, but thinner products are preferred. Spiral shaped products have greater resistance to breakage. Each of the spirals preferably has two flights in 2¼" of length. However, the gap between flights can range from 0.10 inch to 2.0 inches. The spirals are automatically cut into lengths of about two inches or 2¼ inches by a cutting wire as they emerge from the extruder head.

Each spiral as extruded resembles a spiral chute except that the spiral is not wound on a cylinder but rather is just twisted on itself about an axis. The outer edge of each spiral, if extruded in a perfectly spiral shape, would define a helix.

The cut masa spirals fall directly into a fryer containing vegetable cooking oil maintained at a temperature of 400°–405° F. (204°–207° C.). Mechanical action of the fryer moves the spirals through the fryer for an average residence time of about one minute, 45 seconds. The length of time is adjustable, however, to correspond with the completion of the frying of the spirals. Completion of fraying corresponds with cessation of bubbling and a residual moisture content in the spirals of 1.5% or less. The free fatty acid level of the oil in the fryer (a measure of breakdown of the oil) is maintained at a maximum of 0.40%.

When the corn spirals exit the fryer, they pass through a tumbler where salt is applied at a level equivalent to 1.30% of the finished product. At this point, seasonings or flavorings such as nacho-cheese, barbeque or butter flavorings may also be applied to the corn spirals.

The seasoned product is then transported to the packaging area on conveyors. Cooling of the product occurs during this period. The product is finally packaged by automatic packaging machinery, and cartoned.

The foregoing process description is concerned with the production of a corn-based snack food product in spiral form. This represents a preferred embodiment of the invention. While one might expect the fried corn spirals snack food product to be essentially uniform in size and shape, in fact the extrusion process is not perfect, and the drop of the uncooked spirals from the outlet of the extrusion die to the surface of the hot cooking oil results in an impact. This impact may cause shape distortions of various kinds, so that the spirals are not uniform. Similarly, during transport through the cooking oil, the application of heat often causes some distortion, and jostling with other spirals in the fryer may also cause changes in shape. Accordingly, the packaged spiral products may not be perfect helices. Good spirals are considered to be generally straight, and anything up to a 45° deviation from axial is considered essentially straight. Usually about 50% maximum of the spirals are straight as so defined. When the bend is more than 45° from axial, the spirals may be good products in shape. Generally not more than 20% of the spirals snack food product are bent more than 45° from axial. The remaining products will have other degrees of distortion, and generally up to about 10% of the spiral product will be shorter than one inch, despite the fact that the production process sought to produce spiral products of about two inches in length.

To make a nacho cheese-flavored corn spiral product, a nacho cheese seasoning is dusted onto the surface of the fried product in an amount of about 7% by weight of the finished fried product, while still hot from the fryer. Products having other flavors may be produced in similar fashion.

While the preferred snack food product is a corn spiral fried product produced by the process described in detail above, other snack food products may be produced that have similar taste, mouth-feel and texture, but not necessarily the spiral shape. Thus, the dies may be selected to produce an essentially straight ribbon that is cut into the desired lengths. Such straight ribbon-like products come out of the frying operation having less than straight shapes, of course, because of the happenings described with respect to the corn spirals that distort them. Similarly, other dies can be used to produce straight ribbon-like products with a slight twist. Also, by using suitable manufacturing technique, snack food products shaped like cups, scoops, cones, rolls, and curls, for example, can be produced. In addition, other cooking techniques such as baking may be used instead of frying.

The helix-forming dies that are used in the production of the preferred spiral snack food embodiment of the invention are simply those helix-forming dies that have traditionally been used by the pasta industry to make a spiral pasta product called either "rotini" or "spiralli". Other dies are readily available to make ribbon-shaped products of different shapes, or to form extruded straight ribbons into other shapes.

In addition to ribbon forms, the masa of the invention is generally useful in producing cooked snack products in a variety of shaped forms. Thickness is a problem as to obtaining uniform cooking, but this can be handled in a variety of ways, as by microwave cooking, or by a combination of frying with microwave cooking, or by using hollow shapes.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A process for producing a cooked snack food product comprising subjecting a ground masa made from dehulled corn kernels to comminution by simultaneously grating and cutting that reduces the size of particles in the masa, passing the comminuted masa through a die to a ribbon-like form, severing said ribbon-like material to form snack-sized pieces, and cooking said pieces.

2. The process of claim 1 further comprising screening the masa prior to extrusion such that said masa contains particles having a maximum size which does not exceed the largest dimension of the die opening.

3. The process of claim 1 wherein cooking said pieces comprises frying in hot oil to a final moisture content in the range 0.5% to 1.5% by weight.

4. The process of claim 1 wherein the die forms a ribbon-like extrudate having a spiral shape.

5. The process of claim 4 wherein adjacent windings of said spiral shape are separated by gaps of at least 0.10" but not in excess of 2.0", measured axially, and said severed pieces retain their shapes.

6. The process of claim 5 wherein cooking said spiral pieces comprises frying in hot oil to a final moisture content in the range 0.5% to 1.5% by weight.

7. The product produced by the process of claim 1.

8. A process for producing a snack food product comprising the sequential steps of:
   (a) boiling corn kernels in a water and lime solution and allowing the mixture to stand;
   (c) washing the corn kernels with water to remove the hulls;
   (d) grinding the dehulled corn between rotating grinding surfaces to form masa;
   (e) comminuting the particles in the masa by a simultaneous grating and cutting action to reduce particle size;
   (f) delivering the ground, comminuted masa into a piston-type extruder which applies pressure on the masa to force said masa through an extruder head and through helix-forming dies that form a helical ribbon of extruded masa,
   (g) cutting the extruded masa as it passes from the die, and
   (h) allowing said masa to drop into a fryer to cook it.

9. The process of claim 8, wherein said extruder head has a screen of perforated metal through which the masa must pass before reaching the die.

10. The process of claim 9, wherein the screen passes only particles having diameters less than about 0.05 inch.

11. The product produced by the process of claim 8.

* * * * *